United States Patent
Miyamoto et al.

(10) Patent No.: US 7,506,151 B2
(45) Date of Patent: Mar. 17, 2009

(54) SYSTEM FOR MANAGING BOOT-UP OF TARGET COMPUTERS

(75) Inventors: Carleton Miyamoto, San Jose, CA (US); Jagadish Bandhole, Cupertino, CA (US); Sekaran Nanja, San Jose, CA (US)

(73) Assignee: Symantec Operating Corporation, Cupertino, CA (US)

(*) Notice: Subject to any disclaimer, the term of this patent is extended or adjusted under 35 U.S.C. 154(b) by 0 days.

(21) Appl. No.: 11/353,412

(22) Filed: Feb. 14, 2006

(65) Prior Publication Data
US 2006/0136709 A1    Jun. 22, 2006

Related U.S. Application Data

(63) Continuation of application No. 10/241,808, filed on Sep. 10, 2002, now Pat. No. 7,069,428.

(51) Int. Cl.
*G06F 9/24* (2006.01)
(52) U.S. Cl. .................... 713/2; 713/1; 713/100
(58) Field of Classification Search ............... 713/1, 713/2, 100
See application file for complete search history.

(56) References Cited

U.S. PATENT DOCUMENTS

| | | | |
|---|---|---|---|
| 4,925,311 A | 5/1990 | Neches et al. ............... 364/200 |
| 5,394,522 A | 2/1995 | Sanchez-Frank et al. .... 395/159 |
| 5,410,707 A | 4/1995 | Bell ............................. 713/2 |
| 5,418,918 A | 5/1995 | Vander Kamp et al. ......... 713/2 |
| 5,452,454 A | 9/1995 | Basu ............................ 713/2 |
| 5,463,766 A | 10/1995 | Schieve et al. ................. 713/2 |
| 5,479,599 A | 12/1995 | Rockwell et al. ............. 715/837 |
| 5,515,524 A | 5/1996 | Lynch et al. ................ 395/500 |
| 5,555,370 A | 9/1996 | Li et al. ....................... 395/161 |
| 5,577,210 A | 11/1996 | Abdous et al. .............. 709/219 |

(Continued)

FOREIGN PATENT DOCUMENTS

EP    745929 A1    12/1996

(Continued)

OTHER PUBLICATIONS

Huang, Peter, California Polytechnnic State University *Design and Implementation of the CiNIC Software Architecture on a Windows Host*, Feb. 2001, pp. i-87, http://www.ee.calpoly.edu/3comproject/masters-thesis/Huang-Peter.pdf.

(Continued)

*Primary Examiner*—Abdelmoniem Elamin
(74) *Attorney, Agent, or Firm*—Campbell Stephenson LLP

(57) ABSTRACT

A system for managing boot-up of target machines. In a preferred embodiment, a server computer acts as a managing computer. A target machine notifies the server that the target machine has been powered-up. The server allocates an IP address and sends a response to the target machine. The target machine download boot-up software from the server computer. The target machine then downloads discovery software from the server computer for purposes of determining information about the configuration and resources of the target machine. Standard protocols and mechanisms such as DHCP, BOOTP, TFTP and others can be used. The system works with different types of manufacturers' processors and platforms.

15 Claims, 1 Drawing Sheet

U.S. PATENT DOCUMENTS

| | | | | |
|---|---|---|---|---|
| 5,668,995 | A | 9/1997 | Bhat | 395/674 |
| 5,694,600 | A | 12/1997 | Khenson et al. | 713/2 |
| 5,727,213 | A | 3/1998 | Vander Kamp et al. | 713/2 |
| 5,842,011 | A | 11/1998 | Basu | 713/2 |
| 5,894,571 | A | 4/1999 | O'Connor | 395/652 |
| 5,942,738 | A | 8/1999 | Cesaire et al. | 235/380 |
| 5,948,101 | A | 9/1999 | David et al. | 713/2 |
| 5,974,547 | A | 10/1999 | Klimenko | 713/2 |
| 6,009,507 | A | 12/1999 | Brooks et al. | 712/28 |
| 6,058,113 | A | 5/2000 | Chang | 370/390 |
| 6,081,846 | A | 6/2000 | Hyder et al. | 709/250 |
| 6,081,864 | A | 6/2000 | Lowe et al. | 710/129 |
| 6,085,318 | A | 7/2000 | Vander Kamp et al. | 713/1 |
| 6,092,189 | A | 7/2000 | Fisher et al. | 713/1 |
| 6,101,601 | A | 8/2000 | Matthews et al. | 713/2 |
| 6,182,123 | B1 | 1/2001 | Filepp et al. | 709/217 |
| 6,182,275 | B1 | 1/2001 | Beelitz et al. | 717/175 |
| 6,189,100 | B1 | 2/2001 | Barr et al. | 713/182 |
| 6,202,091 | B1 | 3/2001 | Godse | 709/222 |
| 6,230,200 | B1 | 5/2001 | Forecast et al. | 709/226 |
| 6,259,448 | B1 | 7/2001 | McNally et al. | 345/348 |
| 6,262,726 | B1 | 7/2001 | Stedman et al. | 345/333 |
| 6,298,443 | B1 | 10/2001 | Colligan et al. | 713/200 |
| 6,304,965 | B1 | 10/2001 | Rickey | 713/2 |
| 6,308,238 | B1 | 10/2001 | Smith et al. | 710/310 |
| 6,370,560 | B1 | 4/2002 | Robertazzi et al. | 718/105 |
| 6,374,336 | B1 | 4/2002 | Peters et al. | 711/167 |
| 6,393,557 | B1 | 5/2002 | Guthridge et al. | 713/1 |
| 6,421,777 | B1 * | 7/2002 | Pierre-Louis et al. | 713/2 |
| 6,446,126 | B1 | 9/2002 | Huang et al. | 709/226 |
| 6,463,530 | B1 | 10/2002 | Sposato | 713/2 |
| 6,466,972 | B1 | 10/2002 | Paul et al. | 709/222 |
| 6,466,978 | B1 | 10/2002 | Mukherjee et al. | 709/216 |
| 6,477,624 | B1 | 11/2002 | Kedem et al. | 711/147 |
| 6,493,679 | B1 | 12/2002 | Rappaport et al. | 705/29 |
| 6,498,791 | B2 | 12/2002 | Pickett et al. | 370/353 |
| 6,512,526 | B1 | 1/2003 | McGlothlin et al. | 345/762 |
| 6,513,159 | B1 * | 1/2003 | Dodson | 717/178 |
| 6,539,456 | B2 | 3/2003 | Stewart | 711/113 |
| 6,543,047 | B1 | 4/2003 | Vrhel, Jr. et al. | 717/121 |
| 6,550,006 | B1 | 4/2003 | Khanna | 713/2 |
| 6,560,606 | B1 | 5/2003 | Young | 707/100 |
| 6,564,112 | B1 | 5/2003 | Factor | 700/97 |
| 6,577,229 | B1 | 6/2003 | Bonneau et al. | 340/10.41 |
| 6,578,141 | B2 | 6/2003 | Kelley et al. | 713/1 |
| 6,598,131 | B2 | 7/2003 | Kedem et al. | 711/147 |
| 6,601,166 | B1 | 7/2003 | Ayyar et al. | 713/2 |
| 6,615,365 | B1 | 9/2003 | Jenevein et al. | 714/6 |
| 6,633,916 | B2 | 10/2003 | Kauffman et al. | 709/229 |
| 6,662,267 | B2 | 12/2003 | Stewart | 711/113 |
| 6,684,327 | B1 | 1/2004 | Anand et al. | 713/2 |
| 6,711,688 | B1 | 3/2004 | Hubacher et al. | 713/201 |
| 6,748,525 | B1 | 6/2004 | Hubacher et al. | 713/1 |
| 6,757,837 | B1 | 6/2004 | Platt et al. | 714/4 |
| 6,802,062 | B1 | 10/2004 | Oyamada et al. | 718/1 |
| 6,804,774 | B1 | 10/2004 | Larvoire et al. | 713/2 |
| 6,810,478 | B1 | 10/2004 | Anand et al. | 713/2 |
| 6,816,964 | B1 * | 11/2004 | Suzuki et al. | 713/2 |
| 6,854,009 | B1 * | 2/2005 | Hughes | 709/220 |
| 6,988,193 | B2 * | 1/2006 | French et al. | 713/2 |
| 7,065,637 | B1 | 6/2006 | Nanja | 713/1 |
| 7,082,521 | B1 | 7/2006 | Nanja | 713/1 |
| 7,159,106 | B2 * | 1/2007 | Meaney et al. | 713/2 |
| 2003/0046529 | A1 | 3/2003 | Loison et al. | 713/2 |

FOREIGN PATENT DOCUMENTS

EP 841616 A2 5/1998

OTHER PUBLICATIONS

Henry, Mike, Intel Corporation, *Extending PXE to Mobile Platforms*, Jun. 1998, pp. 1-4, http://www.intel.com/update/archive/psn/psn06985.pdf.

International Search Report as mailed from the PCT on Aug. 13, 2004 for WO Application (PCT/US03/28820; Filed Sep. 10, 2003), 3 pages).

Debenham, Clive, "Taos: The Operating System," May 29, 1995, Tantric Technologies, Newsgroups: comp.parallel.

Application Developer's Training Course, SNAP 8.0 Training Participant Guide, Module 7, Copyright © 1997, Template Software, Inc., pp. 7-1 through 7-34.

Workflow Template, Developing A WFT Workflow System, Copyright © 1998, Template Software, Inc.

Workflow Template, Using the WFT Develpoment Environment, Copyright © 1998, Template Software, Inc.

Web Component, Using the Web Component, Copyright © 1997, Template, Inc.

Simon—"Computer System Built to Order"—Nov. 25, 1996—Newsgroups: demon.adverts, midlands.adverts, sanet.adverts, solent.forsale, uk.adverts.computer, unet.adverts, uk.adverts.other, dungeon.forsale.

* cited by examiner

SYSTEM FOR MANAGING BOOT-UP OF TARGET COMPUTERS

CROSS-REFERENCES TO RELATED APPLICATIONS

This application is a continuation of U.S. patent application Ser. No. 10/241,808, entitled "System For Managing Boot-Up Of Target Computers", filed Sep. 10, 2002, now U.S. Pat. No. 7,069,428, and naming Carleton Miyamoto, Jagadish Bandhole and Sckaran Nanja as inventors. This application is assigned to VERITAS Operating Corporation, the assignee of the present invention, and is hereby incorporated by reference, in its entirety and for all purposes. This application is related to the following U.S. patent applications which are hereby incorporated by reference as if set forth in full in this document: Ser. No. 09/663,252 entitled "USER INTERFACE FOR DYNAMIC COMPUTING ENVIRONMENT USING ALLOCABLE RESOURCES" filed on Sep. 15, 2000, now U.S. Pat. No. 7,082,521; and Ser. No. 10/241,809 entitled "SYSTEM FOR AUTOMATED BOOT FROM DISK IMAGE" filed on Sep. 10, 2002, now U.S. Pat. No. 6,986,033.

BACKGROUND OF THE INVENTION

This invention relates in general to digital data processing and more specifically, to a system for managing start-up, or boot-up of computer systems. When a computer system is first powered up many functions must take place to put the computer into an operational stage. These functions are commonly referred to as "boot-up," "booting," "bootstrapping," "booting up," etc.

Typically, the booting procedure is well defined for any given machine. However, procedures can vary from computer to computer especially where the computers have different resources and peripherals, are configured differently, have been made by different manufacturers, are intended to execute different software, etc.

In some computer applications, it is desirable to coordinate, interconnect and configure multiple computer systems so that more computing power, or resources, are available. A problem arises when many computers need to be automatically allocated, controlled or otherwise managed. One approach is to use a managing "server" computer to interrogate, configure or otherwise communicate with and control the multiple "target" computers. However, one problem with this approach is that when the target machines are initially powered up, one or more of them may be designed to automatically boot into an operational mode. In this respect, the server does not have control over the target computer during the boot-up phase. This lack of control may prevent the managing server from properly gaining control of, and configuring, the booting target computer.

Thus, it is desirable to provide a system for managing boot-up of a target machine when the target machine is powered up.

BRIEF SUMMARY OF THE INVENTION

The present invention provides a system for managed boot-up of target machines. In a preferred embodiment, a server computer acts as a managing computer. A target machine notifies the server that the target machine has been powered-up. The server allocates an IP address and sends a response to the target machine. The target machine downloads boot-up software from the server computer. The target machine then downloads discovery software from the server computer for purposes of determining information about the configuration and resources of the target machine.

Standard protocols and mechanisms such as DHCP, BOOTP, TFTP and others are used. The system works with different types of manufacturers' processors and platforms.

In one embodiment the invention provides a system for controlling boot-up of a target machine upon power-up, the system comprising a managing processor; a notification mechanism coupled to the target machine for sending a notification to the managing processor that the target machine has been powered-up; discovery software for determining one or more resources in the target machine; and server software executed by the managing processor for transferring the boot-up software to the target machine in response to the notification.

In another embodiment the invention provides a method for controlling boot-up of a target machine upon power-up, the method comprising using a managing processor to receive a notification from the target machine indicating that the target machine has been powered-up; and transferring discovery software from the managing processor to the target machine, wherein the discovery software determines one or more resources in the target machine.

DETAILED DESCRIPTION OF THE INVENTION

Figure 1:
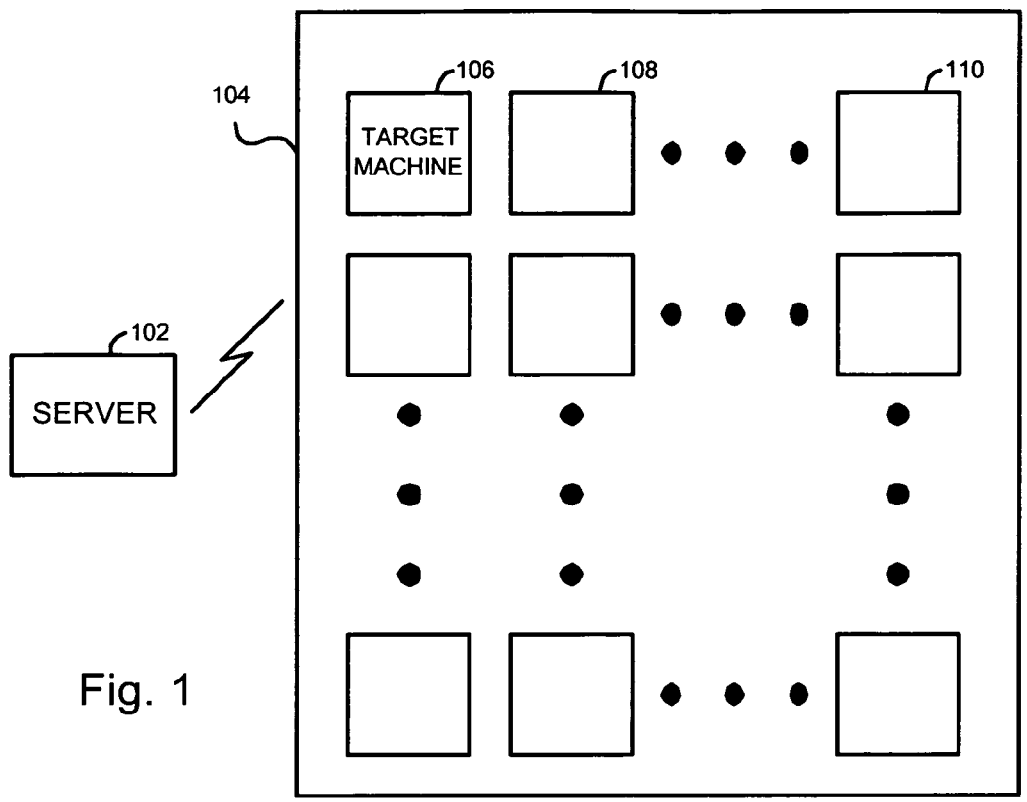
FIG. 1 shows an application of the system of the present invention.

FIG. 1 shows an application of the system of the present invention.

In FIG. 1, server 102 is a computer system for managing target machines in a configurable network. The configurable network is represented by resource 104. Any type of processing equipment or devices can be considered resources including processing units, memory, communication bandwidth, storage, functionality, etc. Such resources can be provided by software, hardware or a combination of both.

Server 102 detects when target machines such as 106, 108 and 110 are initially powered up. A preferred embodiment of the invention requires a human administrator to manually power up one or more target machines. Other embodiments can automate the power-up process. Server 102 then acts to control the boot up of one or more of the target machines, as desired. During boot-up, characteristics and resources that are local to a specific target machine (e.g., disk drive, random-access memory (RAM), processor type, peripherals, communication ability such as network cards, etc.) are determined or "discovered" and reported back to the server. After controlled boot-up and discovery, server 102 can also activate, allocate, or configure, resources, including resources 104, to work with a target machine. Server 102 can manage operations including loading software on the target machines, directing interconnectivity of target machines on a network, etc.

A preferred embodiment of the invention is adapted for use with dynamic computing environments (DCEs) such as the DCE described in co-pending U.S. patent application Ser. No. 09/663,252 entitled "USER INTERFACE FOR DYNAMIC COMPUTING ENVIRONMENT USING ALLOCABLE RESOURCES" filed on Sep. 15, 2000.

Target machines can be any type of computer system or other processing device. For example, personal computer systems, servers, workstations, mainframes, etc., can be target machines. Such machines can be based around different manufacturers' designs such as Intel, Advanced Micro Devices (AMD), SUN Microsystems, etc. Different models, versions and configurations of machines are typically available from each manufacturer. For example, some machines may vary in the processor type, attached peripherals, internal memory capacity, communication ability, etc. Target machines can also be devices that are not based on a general purpose microprocessor design. For example, target devices can be based on parallel processing, distributed processing, asynchronous or other designs. Target machines can be standalone peripherals, network devices, etc. Target machines can use customized circuitry, application-specific integrated circuits (ASICs), field-programmable gate arrays (FPGAs), discrete, dedicated or custom circuitry, etc. In general, any type of device, including digital, analog, mechanical, biotechnology, optical, etc. can be a target machine.

In the preferred embodiment, the target machines are interconnected based on specific configuration. The interconnection mechanism can be by hardwire, fiberoptic, wireless or other type of communication link. A digital network such as, e.g., Ethernet, IEEE 1394, universal serial bus (USB), 802.11b, etc. can be used. In a preferred embodiment, the linking of communication channels between target machines, the server, external devices and networks (such as the Internet), etc., is controlled and managed by the server.

Note that server 102 can, similarly, be any type of a processing device from any manufacturer. Many types of processing devices can be used to implement server 102. Additionally, different types of software from those specifically discussed herein can be run on server 102 to achieve the same functionality described in the present invention. Multiple computers or devices can be used to achieve the functionality of the managing server, discussed herein. In the preferred embodiment, the managing server executes software manufactured by Jareva Technologies, Inc., and referred to as "OpForce." Other software that performs functionality described herein manufactured by Jareva Technologies, Inc., includes "ActiveOS" and "OpBoot."

A preferred embodiment of the invention executes on Intel x86 chips and is written in a standard Linux INITRD format. OpBoot is treated as a Network Boot Program (NBP) within the Linux environment as defined by the PXE standard. Steps accomplished by this preferred embodiment are listed in Table I, below.

TABLE I

1. Initialize and read parameters form DHCP option-135 (see, e.g., DHCP standard RFC-2131 for description of DHCP options);
2. TFTP the two ActiveOS files into extended memory into the standard locations defined by Linux; and
3. Jump to the start of the Linux kernel (as defined by Linux).

Another embodiment executes on a Solaris platform. The Solaris version of the ActiveOS is a miniaturized version of the Sun Solaris OS. A bootstrap program is TFTPed and the rest of the ActiveOS is NFS mounted using the standard Solaris mechanisms. It should be apparent that any type of software that achieves the functions, operations and other aspects of the invention can be suitable for use in accordance with the invention and is within the scope of the invention, as claimed.

A preferred embodiment of the invention uses popular standardized protocols to allow the managing server to prepare target machines for communication and operation upon boot-up. The Dynamic Host Configuration Protocol (DHCP) is used to automate the assignment of Internet Protocol (IP) addresses in the resource network. A Bootstrap Protocol (BOOTP) along with DHCP options and BOOTP vendor information extensions is also used. This allows target machines without disks and specific bootstrapping software to discover the target machine's own IP address, the address of a server host and the name of a file to be loaded into memory and executed. Descriptions of these protocols can be found on the Internet, or by reference to the following Request For Comments (RFCs): RFC9510, RFC2131 and RFC2132. Other protocols for communicating within the DHCP framework include: Boot Control Transfer Protocol (BCTP), Trivial File Transfer Protocol (TFTP), user datagram protocol (UDP) and others. It should be apparent that the specific use of these protocols is not necessarily to practice the invention. In general, any type of protocol, communication scheme, network architecture, etc. can be acceptable for use with the present invention.

A preferred embodiment of the invention uses a mechanism whereby, upon powerup, a target machine communicates to the server that the target machine is ready to boot. In the preferred embodiment, each target machine is provided with a Network Interface Card (NIC) such as one that follows the Preboot Execution Environment (PXE) standard. The PXE NIC broadcasts a "ready-to boot" message to the server upon powerup. The server then transfers an executable object to the target machine. In a contemplated embodiment, the executable object is about 8 MB and is called ActiveOS. ActiveOS is loaded and executed via instructions in OpBoot onto the target machine. ActiveOS then inspects the target machine to discover the hardware configuration, basic input/output system (BIOS) version and other aspects of the target machine. In the preferred embodiment, ActiveOS runs completely in memory so that no hard disk is needed since some target machines may not have hard disks. ActiveOS is based on LINUX and launches a LINUX kernel to put up a TCP/IP stack.

Table II shows some of the information discovered and sent back to the server by ActiveOS.

TABLE II

Memory
Hard disks
Central Processing Unit (CPU)
Motherboard chip set
System management (BIOS) information Serial number
Model name
BIOS date/version
Computer manufacturer
BIOS vendor
Computer CPU family
Blade Chassis Location (if a blade)
Blade chassis serial number (if a blade)
Blade chassis IP address (if a blade)
Blade chassis model (if a blade)
Rack serial number
Network cards Table III shows an example of a format used to report information back to the server in a preferred embodiment. Note that other embodiments can use any suitable format. The protocol used in Table III is BCTP. The protocol is BCTP.

TABLE III

```
--- StatusComplete 1
memsize=128;arch=i686;chipset=8086.7124;cpus=1;cpumhz=598;net=
{count=2;0={name=eth0;type=Ethernet;hwaddr=00:D0:B7:7E:94:BA};1=
{name=eth1;type=Ethernet;hwaddr=00:90:27:F9:5B:B5}};hd={count=
1;0={name=/dev/hda;size=13}};smbios={BSmanufacturer=
{Intel\sCorp.};BSversion={CA81020A.86A.0005.P02.9911300426};
BSreleaseDate={11/30/1999};MBcpuCount=1;MBavgCpuMhz=
600;MBcpuFamily=17;MBmem=128}
```

In the preferred embodiment, the information in Table I, and additional information, as desired, is acquired from the target machine when ActiveOS receives a request from the server to generate hardware information. The results of discovering hardware information are sent back to server 102 in the form of scoped attribute value pairs in BCTP protocol. Again, other formats can be employed.

After discovery, the server provides a provisioning agent to the target machine. The provisioning agent is used to install desired software on the target machine. Since different hardware configurations require different types, or versions, of software, the provisioning agent is not loaded until after the hardware configuration of the target machine has been discovered. In a preferred embodiment, the provisioning agent is part of the ActiveOS.

A management system on the server receives a request either automatically, or from a user, that provides a definition of how to configure the target machines and other resources. The server communicates to the provisioning agent which software to install. The provisioning agent can obtain the software to be installed from the server or from a different source.

By default, the provisioning agent obtains the software from a storage server, such as an NFS server, a CIFS server, the OpForce server, etc. In general, the software can be obtained from any server connected to the network using a variety of protocols including custom software. OpForce supports a form of software called "ActiveOS software". The user can write a custom program that runs on the ActiveOS. This program is free to implement a protocol and gather information from any server reachable on the network. In fact, the user can use this to extend the hardware detection that we already do. The user first writes a standard Linux based application. This application is the uploaded into the OpForce system and placed on a storage server. When requested by the user, OpForce tells the ActiveOS to execute the software stored on the storage server. The BCTP messages looks similar to those shown in Table IV.

TABLE IV

```
--- SetAppDir nfs nfsserver:/directory
--- Modify myExecutable 1 argument1
```

Because these extensions are accessed from a separate server, the size is not limited to the amount of disk space or the amount of memory on the server. In addition, the extension can use the standard NFS or CIFS protocols, which are much faster and more convenient to use than other protocols, like TFTP or plain TCP/IP.

When receiving this message, the ActiveOS accesses the NFS server, obtains the executable, and executes it.

Table V, below, shows basic steps in a procedure for controlled booting of a target machine where the target machine uses an Intel x86 architecture. Table V also shows, in curly brackets, the alternative protocol to be used when the machine is a SOLARIS type of machine as manufactured by SUN Microsystems, Inc., rather than an Intel machine. In a similar manner, other types of machines can be accommodated.

TABLE V

| | |
|---|---|
| 1. | Use DHCP {Solaris = RARP} broadcast to find MAC |
| 2. | OpForce (or other server software) allocates IP and send DHCP {Solaris = RARP} response |
| 3. | Target downloads OpBoot through TFTP {Solaris = not used} |
| 4. | OpBoot downloads ActiveOS through TFTP {Solaris = NFS} |

Different versions of ActiveOS are downloaded depending on the detected platform (e.g., SOLARIS OR INTEL). A preferred embodiment automatically determines the correct ActiveOS to use without any user input. DHCP option 60 (see the PXE standard) includes a string containing the architecture that is used to automatically select the correct ActiveOS. The target machine is then booted into the ActiveOS as previously described. ActiveOS is then used to discover the hardware in the machine. This is all done automatically without any user input and without any OS on the machine's hard disk. Other embodiments can use different degrees of manual and automatic operations.

Figure 2:
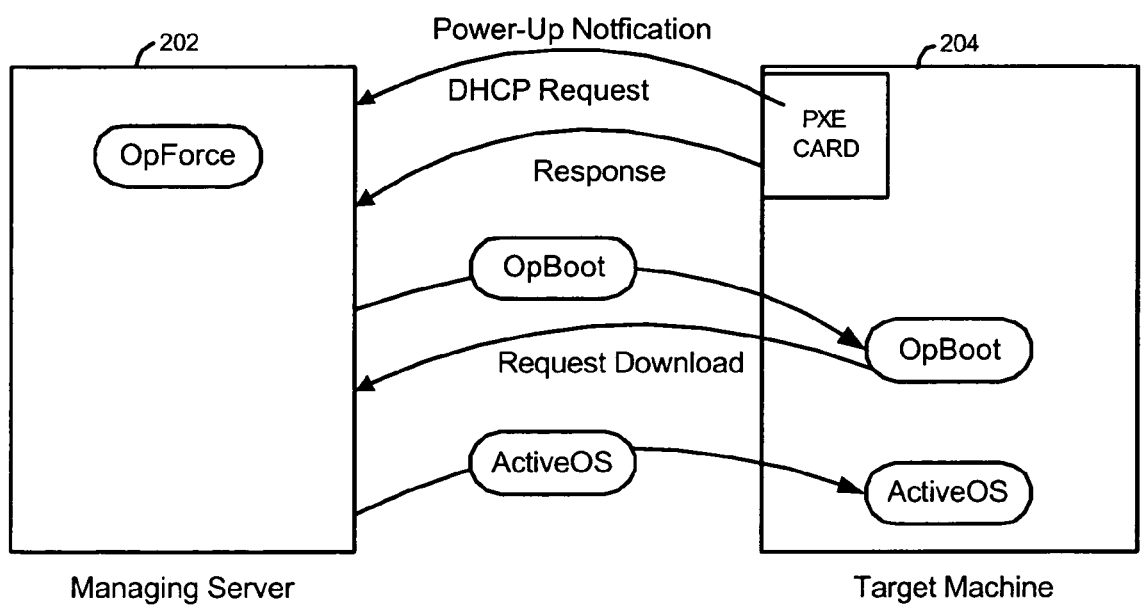
FIG. 2 illustrates steps in a managed boot-up procedure.

FIG. 2 illustrates the steps of Table V. In FIG. 2, managing server 202 controls the boot-up of target machine 204. For ease of illustration, only a single target machine, and single type (Intel architecture) of target machine, is discussed.

Upon power-up, target machine 204 sends a notification to managing server 202. In the preferred embodiment, the notification is made using a PXE card installed in the target machine. In other embodiments, different notification mechanisms can be used. PXE uses the DHCP protocol to generate a request, or notification. OpForce, executing in the managing server, receives the request, allocates an IP address and sends a response. Next, the target machine requests a download of software from the managing server. This results in the managing server transferring OpBoot. The target machine then executes OpBoot, which requests a download of ActiveOS. ActiveOS is provided by the managing server and is installed and run on the target machine.

In the preferred embodiment, ActiveOS is sent as a compressed file of about 8 MB. It is also possible to send the file uncompressed at a size of about 30 MB. Once loaded, ActiveOS is executed to allow the server to direct discovery and provisioning of the target machine. Details of these operations are described in detail in co-pending patent applications listed, above.

Although the system of the present invention has been described with respect to specific embodiments thereof, these embodiments are illustrative, and not restrictive, of the invention, the scope of which is determined solely by the appended claims.

What is claimed is:

1. A method comprising:
   configuring a first computer, wherein said configuring comprises:
      discovering configuration information of the first computer, wherein said discovering comprises discovering Basic Input/Output System (BIOS) information for the first computer;
      transmitting the configuration information of the first computer, wherein
         said transmitting transmits the configuration information to a second computer and comprises formatting the configuration information into scoped attribute-value pairs; and receiving a provisioning agent from said second computer, wherein
the provisioning agent is configured to execute on the first computer to install selected software, and
the selected software is selected using the configuration information.

2. The method of claim 1 further comprising:
storing a first set of instructions in a memory on the first computer, wherein
the first set of instructions are configured to execute on the first computer to perform said discovering.

3. The method of claim 2 further comprising:
receiving the first set of instructions from the second computer.

4. The method of claim 2 further comprising:
transmitting a request to the second computer for the first set of instructions.

5. The method of claim 1 wherein said discovering the configuration information further comprises:
discovering hardware configuration information.

6. The method of claim 5 wherein the hardware configuration information comprises:
information describing one or more of memory capacity, memory type, disk drives, CPU type, CPU speed, and motherboard chipset.

7. The method of claim 1 wherein the BIOS information comprises:
information describing one or more of serial number, model name, BIOS date, BIOS version, manufacturer identification of the first computer, BIOS vendor, CPU family, blade chassis location, blade chassis serial number, blade chassis IP address, blade chassis model, and rack serial number.

8. The method of claim 1 wherein said discovering the configuration information further comprises:
discovering network interface information.

9. The method of claim 1 wherein said transmitting the configuration information further comprises:
performing said transmitting using boot control transfer protocol.

10. The method of claim 1 further comprising:
installing the software on the first computer from a storage server coupled to the first computer.

11. The method of claim 10 wherein the software comprises an operating system for the first computer.

12. The method of claim 11 wherein the operating system is configured to support resources identified in the configuration information of the first computer.

13. The method of claim 1 further comprising:
providing a dynamic computing environment (DCE) coupled to a managing processor, wherein
the DCE comprises resources, wherein
the resources comprise one or more of network resources, data storage resources, and computing resources; and
coupling one or more DCE resources to the first computer in response to an instruction from the managing processor.

14. A system comprising:
a processor;
a memory coupled to said processor and configured to store instructions executable on the processor for configuring the system, wherein the instructions comprise:
a first set of instructions for discovering configuration information of the system, wherein said discovering comprises discovering Basic Input/Output System (BIOS) information for the first computer;
a second set of instructions for forming a datastream comprising the configuration information of the system, wherein the configuration information is formatted into scoped attribute-value pairs; and
a third set of instructions for installing selected software on the system, wherein
the selected software is selected using the configuration information of the system; and
a network line card coupled to the processor and configured to:
transmit the datastream comprising the configuration information to a second computer, and
receive the third set of instructions from the second computer.

15. An apparatus comprising:
means for configuring a first computer, wherein said means for configuring comprises:
means for discovering configuration information of the first computer, wherein said discovering comprises discovering Basic Input/Output System (BIOS) information for the first computer; and
means for forming a datastream comprising the configuration information, wherein the configuration information is formatted into scoped attribute-value pairs; and
means for transmitting the datastream comprising the configuration information of the first computer, wherein
said means for transmitting the configuration information to a second computer; and
means for installing selected software on the first computer, wherein
said means for installing are received from the first computer, and
the selected software is selected using the configuration information.

* * * * *